US008229413B2

(12) United States Patent  
Brown et al.

(10) Patent No.: US 8,229,413 B2
(45) Date of Patent: Jul. 24, 2012

(54) MESSAGE FILTER PROGRAM FOR A COMMUNICATION DEVICE

(75) Inventors: Michael K. Brown, Fergus (CA); Michael S. Brown, Kitchener (CA); Michael E. McCallum, Elmira (CA)

(73) Assignee: Research In Motion Limited, Waterloo (CA)

( * ) Notice: Subject to any disclaimer, the term of this patent is extended or adjusted under 35 U.S.C. 154(b) by 634 days.

(21) Appl. No.: 12/032,833

(22) Filed: Feb. 18, 2008

(65) Prior Publication Data

US 2009/0209243 A1 Aug. 20, 2009

(51) Int. Cl.
*H04M 3/00* (2006.01)

(52) U.S. Cl. ............ 455/419; 455/412.1; 455/415; 455/466; 455/566; 709/206; 709/216; 709/219; 379/142.01; 379/142.06; 379/210.02

(58) Field of Classification Search ............ 455/90.3, 455/412.1, 412.2, 413, 414.1, 414.2, 414.3, 455/414.4, 415, 418–420, 466, 550.1, 556.1, 455/556.2, 558, 563, 566, 567, 575.1; 709/206, 709/207, 216, 217, 219; 379/67.1, 88.08, 379/88.11, 88.12, 142.06, 210.02, 210.03
See application file for complete search history.

(56) References Cited

U.S. PATENT DOCUMENTS

| 6,535,229 | B1 | 3/2003 | Kraft |
| 6,912,519 | B2 | 6/2005 | Shouji |
| 2005/0048998 | A1 | 3/2005 | Zhu |
| 2005/0091319 | A1* | 4/2005 | Kirsch ............ 709/206 |
| 2005/0149606 | A1* | 7/2005 | Lyle et al. ............ 709/200 |
| 2005/0160144 | A1* | 7/2005 | Bhatia ............ 709/206 |
| 2005/0164720 | A1* | 7/2005 | Huang ............ 455/466 |
| 2005/0169274 | A1* | 8/2005 | Shuster ............ 370/392 |
| 2005/0198173 | A1 | 9/2005 | Evans |
| 2006/0019684 | A1* | 1/2006 | Yu et al. ............ 455/466 |
| 2006/0239430 | A1 | 10/2006 | Gue et al. |
| 2006/0271688 | A1* | 11/2006 | Viger et al. ............ 709/227 |
| 2007/0106728 | A1* | 5/2007 | Adams et al. ............ 709/206 |
| 2007/0133757 | A1* | 6/2007 | Girouard et al. ............ 379/67.1 |
| 2008/0027955 | A1* | 1/2008 | May et al. ............ 707/100 |
| 2008/0250106 | A1* | 10/2008 | Rugg et al. ............ 709/206 |
| 2008/0270540 | A1* | 10/2008 | Larsen ............ 709/206 |
| 2009/0149203 | A1* | 6/2009 | Backholm et al. ............ 455/466 |

FOREIGN PATENT DOCUMENTS

| GB | 2404052 | 1/2005 |
| WO | 2005067233 | 7/2005 |
| WO | 2007136314 | 11/2007 |

OTHER PUBLICATIONS

Examination Report dated Jun. 16, 2011. In corresponding application No. 08151576.9.
Extended Search Report dated Nov. 19, 2008. In corresponding application No. 08151576.9.
Partial Search report dated Sep. 2, 2008. In corresponding application No. 08151576.9.

* cited by examiner

*Primary Examiner* — Anthony Addy
(74) *Attorney, Agent, or Firm* — Novak Druce + Quigg LLP

(57) ABSTRACT

A communication device is configured to receive messages. The communication device may comprise a display screen upon which messages are displayed. A microprocessor configured to execute at least one message management program on the communication device, filters incoming messages. The message management program comprising a message filter application filters messages based on a comparison of sender identification data associated with a message to approved sender identification data.

24 Claims, 8 Drawing Sheets

MESSAGE FILTER PROGRAM FOR A COMMUNICATION DEVICE

FIELD

This disclosure, in a broad sense, is directed toward an electronic device that has communication capabilities. The present disclosure further relates to filtering received messages based on a comparison to approved sender identification data that has been retrieved from one or more remote databases.

BACKGROUND

With the proliferation of communication systems, compatible communication devices are becoming more prevalent, as well as advanced. Examples of communication devices include both handheld communication devices as well as larger devices such as laptop computers, desktop computers and the like. These devices are capable of sending and receiving a variety of different messages including but not limited to short message service (SMS), multimedia message service (MMS), emails, voice messages, and the like.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
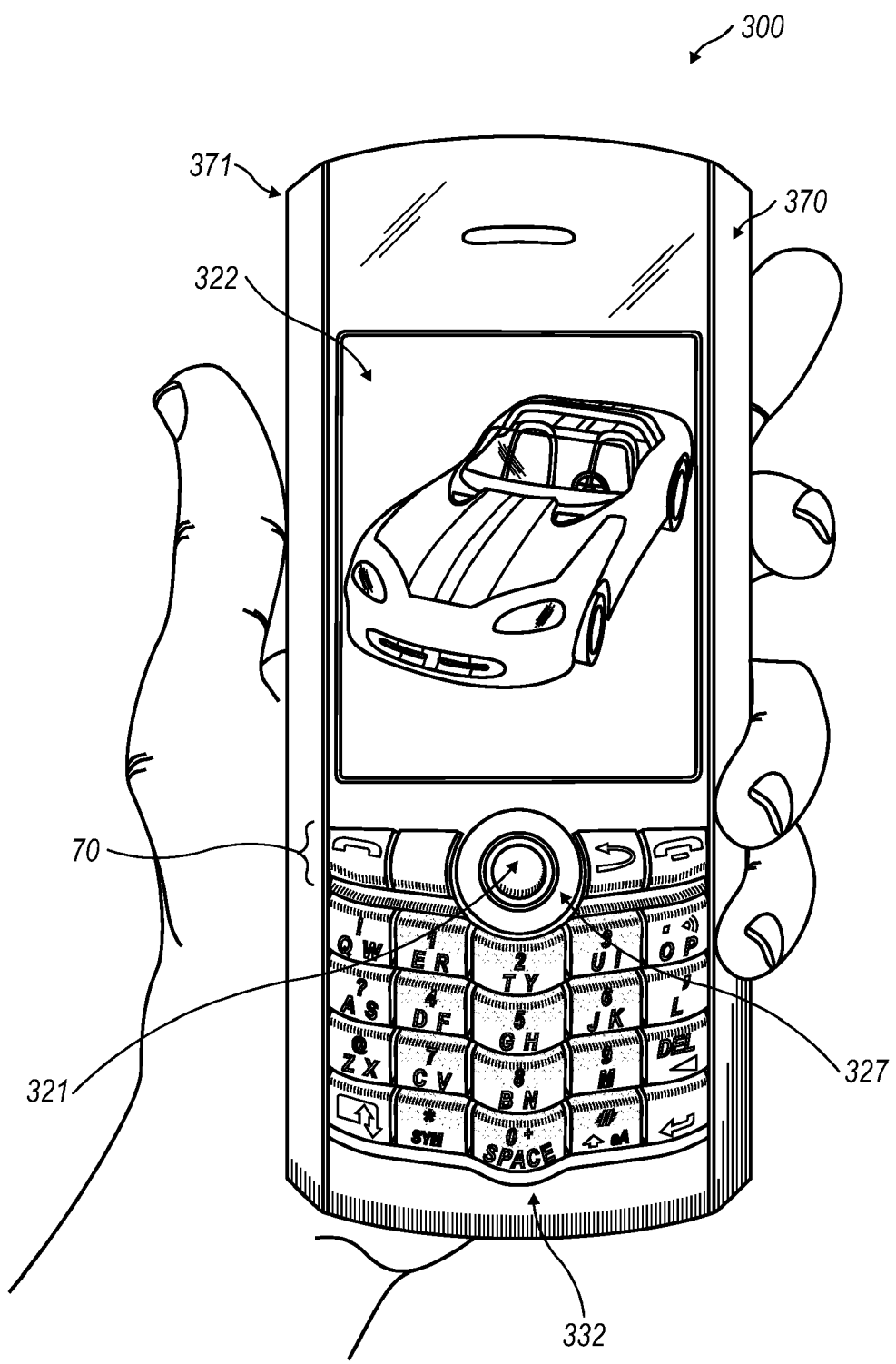
FIG. 1 illustrates an exemplary handheld communication device having a reduced QWERTY keyboard and which is capable of incorporating the message filtering applications and methods described in the present disclosure.
Figure 2:
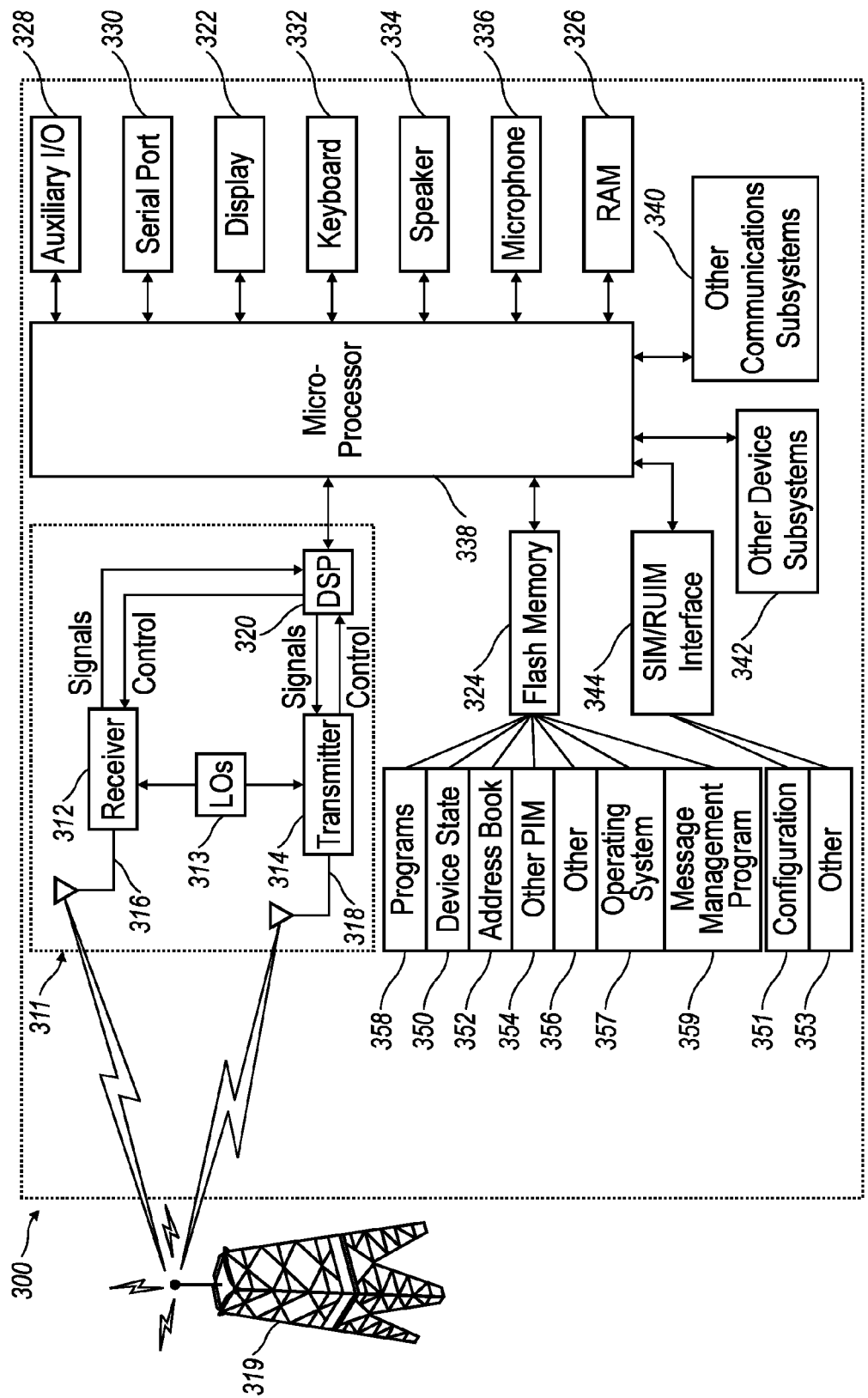
FIG. 2 is a block diagram representing a handheld communication device interacting in a communication network.

An exemplary communication device 300 is shown in FIG. 1, and the device's cooperation in a wireless network 319 is exemplified in the block diagram of FIG. 2. These figures are exemplary only, and those persons skilled in the art will appreciate the additional elements and modifications necessary to make the communication device 300 work in particular network environments. While in the illustrated embodiment, the communication device 300 comprises a handheld communication device, and in this particular example, a smart phone, in other embodiments, the communication device 300 may comprise a handheld wireless communication device, a personal digital assistant (PDA), laptop computer, desktop computer, a server, or other communication device.

As shown in the block diagram of FIG. 2, the communication device 300 includes a microprocessor 338 that controls the operation of the communication device 300. A communication subsystem 311 performs all communication transmission and reception with the wireless network 319. The microprocessor 338 further can be connected with an auxiliary input/output (I/O) subsystem 328 which can be connected to the device. Additionally, in at least one embodiment, the microprocessor 338 can be connected to a serial port (for example, a Universal Serial Bus port) 330 which can allow for communication with other devices or systems via the serial port 300. A display 322 can be connected to microprocessor 338 to allow for displaying of information to an operator of the device. When the communication device 300 is equipped with a keyboard 332, the keyboard can also be connected with the microprocessor 338. The communication device 300 can include a speaker 334, a microphone, 336, random access memory (RAM), and flash memory 324 all of which may be connected to the microprocessor. Other similar components may be provided on the device as well and optionally connected to the microprocessor 338. Other communication subsystems 340 and other communication device subsystems 342 are generally indicated as being functionally connected with the microprocessor 338 as well. An example of a communication subsystem 340 is that of a short range communication system such as BLUETOOTH® communication module or a WI-FI® communication module (a communication module in compliance with IEEE 802.11b) and associated circuits and components. Additionally, the microprocessor 338 is able to perform operating system functions and enables execution of programs on the communication device 300. In some embodiments not all of the above components may be included in the communication device 300. For example, in at least one embodiment the keyboard 332 is not provided as a separate component and is instead integrated with a touchscreen as described below.

The auxiliary I/O subsystem 328 can take the form of a variety of different navigation tools (multi-directional or single-directional) such as a trackball navigation tool 321 as illustrated in the exemplary embodiment shown in FIG. 1, or a thumbwheel, a navigation pad, a joystick, touch-sensitive interface, or other I/O interface. These navigation tools may be located on the front surface of the communication device 300 or may be located on any exterior surface of the communication device 300. Other auxiliary I/O subsystems can include external display devices and externally connected keyboards (not shown). While the above examples have been provided in relation to the auxiliary I/O subsystem 328, other subsystems capable of providing input or receiving output from the communication device 300 are considered within the scope of this disclosure. Additionally, other keys may be placed along the side of the communication device 300 to function as escape keys, volume control keys, scrolling keys, power switches, or user programmable keys, and may likewise be programmed accordingly.

As may be appreciated from FIG. 1, the communication device 300 comprises a lighted display 322 located above a keyboard 332 constituting a user input and suitable for accommodating textual input to the communication device 300. The front face 370 of the communication device 300 has a navigation row 70. As shown, the communication device 300 is of unibody construction, also known as a "candy-bar" design.

Keys, typically of a push-button or push-pad nature, perform well as data entry devices but present problems to the operator when they must also be used to effect navigational control over a screen-cursor. In order to solve this problem the present communication device 300 may include an auxiliary input that acts as a cursor navigation tool 327 and which is also exteriorly located upon the front face 370 of the communication device 300. Its front face location allows the tool to be easily thumb-actuable like the keys of the keyboard 332. An embodiment provides the navigation tool 327 in the form of a trackball 321 which can be utilized to instruct two-dimensional screen cursor movement in substantially any direction, as well as act as an actuator when the trackball 321 is depressed like a button. The placement of the navigation tool 327 may be above the keyboard 332 and below the display screen 322; here, it can avoid interference during keyboarding and does not block the operator's view of the display screen 322 during use. (See FIG. 1).

As illustrated in FIG. 1, the communication device 300 may be configured to send and receive messages. The communication device 300 includes a body 371 which may, in some embodiments, be configured to be held in one hand by an operator of the communication device 300 during text entry. A display 322 is included which is located on a front face 370 of the body 371 and upon which information is displayed to the operator during text entry. The communication device 300 may also be configured to send and receive voice communications such as mobile telephone calls.

Furthermore, the communication device 300 is equipped with components to enable operation of various programs, as shown in FIG. 2. In an exemplary embodiment, the flash memory 324 is enabled to provide a storage location for the operating system 357, device programs 358, and data. The operating system 357 is generally configured to manage other programs 358 that are also stored in memory 324 and executable on the processor 338. The operating system 357 honors requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device program 358 or parts thereof may be loaded in RAM 326 or other volatile memory.

As shown in FIG. 2, a message management program 359 is stored on Flash Memory 324. The message management program 359 can include a message filter application that filters received messages based on a comparison of sender identification data associated with a received message to approved sender identification data stored in a remote database and accessed over the internet. The message filter application in other embodiments may be a stand alone application, incorporated into the operating system 357, or incorporated into another program. While it is contemplated that each received message may be checked against approved sender identification data over the internet, it is also contemplated that approved sender identification data stored on the remote database can be retrieved to the communication device 300 where the individual comparisons take place. Among others, the received message may comprise, for example, an email message. As another example, the received message may comprise a SMS message or a MMS message. As a further example, the received message may comprise an IM (Instant Messaging) message. As yet another example, the received message may comprise a Personal Identification Number (PIN) message. As used in this context, a PIN generally refers to a number that uniquely identifies the communication device 300. The received message may also comprise a voice mail message. The received message may comprise other types of messages which may be currently known or later developed in accordance with after-arising technologies.

In at least one embodiment, the message management program 359 is based upon the type of message that is being processed by the message management program. In other embodiments, a combined message management program can be used for the various types of messages that the communication device 300 is designed to receive. For example a single message management program might be an email message management program. In another embodiment, the combined message management program might manage emails, MMS messages, and SMS messages. Other examples, which are not limiting, are provided below.

In one embodiment, the received message is an email and the message management program is an email program. In this embodiment, the message management program includes a message filter application, that when activated, filters received emails based on a comparison of the email address of the sender of the email message (sender identification data) to one or more stored email addresses (approved sender identification data) retrieved from a remote database. Typically, an email address will have been stored if an email has either been accepted from, or sent to that email address. In another embodiment the IM name will have been stored if an IM has either been accepted from, or sent to that IM name or address.

In one variation, just the domain of the email sender's address (that portion of the address immediately following the "at" symbol 422 in the email address) is compared to one or more stored approved domain names. In another variation, just the name portion of the email address of the sender's email (that portion of the address immediately preceding the "at" symbol 422 in the email address) is compared to stored approved names. In other embodiments, a host name rather than a domain name might be implemented so that the host of the email server is known rather than just relying on the domain name of the email address. For example, a company may own several smaller companies each having their own domain names; however, it might be desirable to filter messages based upon whether they are from someone else within the controlling company. In this example, the operator in a sub-company could easily manage messages received from others inside of the parent company or from those inside sister companies.

In another embodiment, the message management program comprises a SMS or MMS type telephone message filter application that filters received SMS or MMS messages based on a comparison of the phone number of the sender of the message (sender identification data) to one or more stored phone numbers (approved sender identification data) retrieved from a remote database. Here, a phone number will normally have been stored if a message has been previously exchanged with the phone number.

In another embodiment, the message management program includes a message filter application that filters received PIN messages based on a comparison of a PIN associated with the message (sender identification data) to one or more stored PIN numbers (approved sender identification data) retrieved from a remote database. In this embodiment the message can be a PIN message.

In one exemplary embodiment, the flash memory 324 contains programs 358 for execution on the communication device 300 including an address book 352, a personal information manager (PIM) 354, and the device state 350. Furthermore, programs 358 and other information 356 including data can be segregated upon storage in the flash memory 324 of the communication device 300.

When the communication device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 300 may require a unique identifier to enable the communication device 300 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems use a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the communication device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled communication device 300 is able to both transmit and receive information from the communication network 319. The transfer of communication can be from the communication device 300 or to the communication device 300. In order to communicate with the communication network 319, the communication device 300 in the presently described exemplary embodiment is equipped with an integral or internal antenna 318 for transmitting signals to the communication network 319. Likewise the communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the communication device 300.

When equipped for two-way communication, the communication device 300 features a communication subsystem 311. As is understood in the art, this communication subsystem 311 is modified so that it can support the operational needs of the communication device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the communication device 300 with the wireless network 319 can be any type of communication that both the wireless network 319 and communication device 300 are enabled to transmit, receive and process. In general, these can be classified as voice and data. Voice communication generally refers to communication in which signals for audible sounds are transmitted by the communication device 300 through the communication network 319. Data generally refers to all other types of communication that the communication device 300 is capable of performing within the constraints of the wireless network 319.

Example device programs that can depend on such data include email, contacts and calendars. For each such program synchronization with home-based versions on the programs can be desirable for either or both of their long term and short term utility. As an example, emails are often time sensitive, so substantially real time synchronization may be desired. Contacts, on the other hand, can be usually updated less frequently without inconvenience. Therefore, the utility of the communication device 300 is enhanced when connectable within a communication system, and when connectable on a wireless basis in a network 319 in which voice, text messaging, and other data transfer are accommodated.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 322, which in one embodiment is enabled by touching the display screen 322, for example, with a stylus, finger, or other pointer, to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular program or feature of the communication device 300 is shown on the display screen 322 in the same configuration as the physical keys. Using this configuration, the operator can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3:
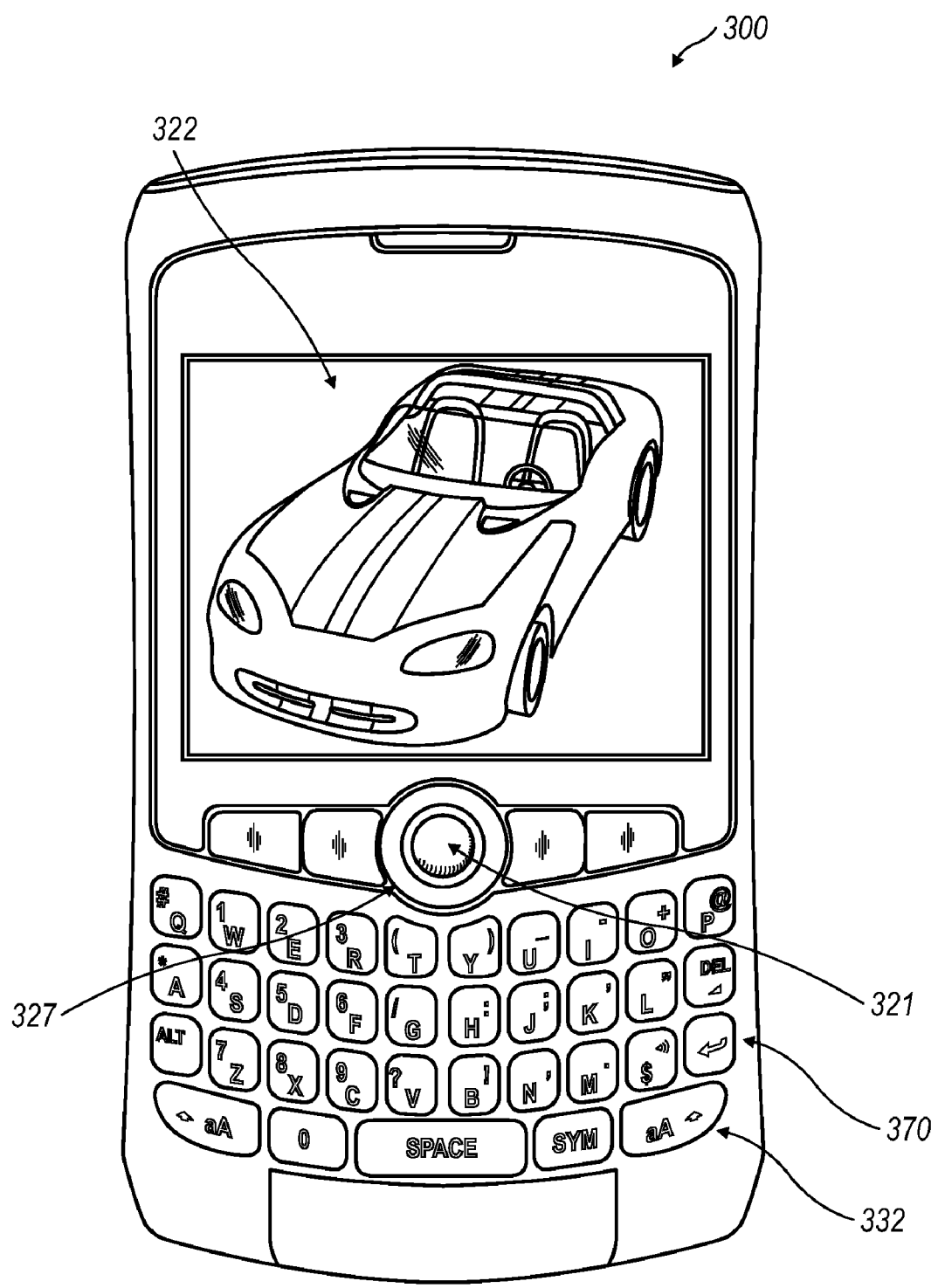
FIG. 3 illustrates an exemplary handheld communication device having a full QWERTY keyboard and which is capable of incorporating the message filtering applications and methods described in the present disclosure.

In at least one embodiment, a communication device 300 that is configured to send and receive email messages comprises a body 371 configured to be held in a text entry orientation by an operator or user. (For example see FIGS. 1 and 3). The body 371 of the communication device 300 has a front face 370 at which a display screen 322 is located and upon which information is displayed to the operator of the communication device 300 in the text entry orientation. The communication device 300 further comprises a microprocessor configured to run programs on the communication device 300 and to receive operator commands from user inputs, such as a keyboard 332 and trackball 321, located on the communication device 300.

While the above description generally describes the systems and components associated with a handheld communication device, the communication device 300 could be another communication device such as a PDA, a laptop computer, desktop computer, a server, or other communication device. In those embodiments, different components of the above system might be omitted in order provide the desired communication device 300. Additionally, other components not described above may be required to allow the communication device 300 to function in a desired fashion. The above description provides only general components and additional components may be required to enable the system to function. These systems and components would be appreciated by those of ordinary skill in the art.

Figure 4:
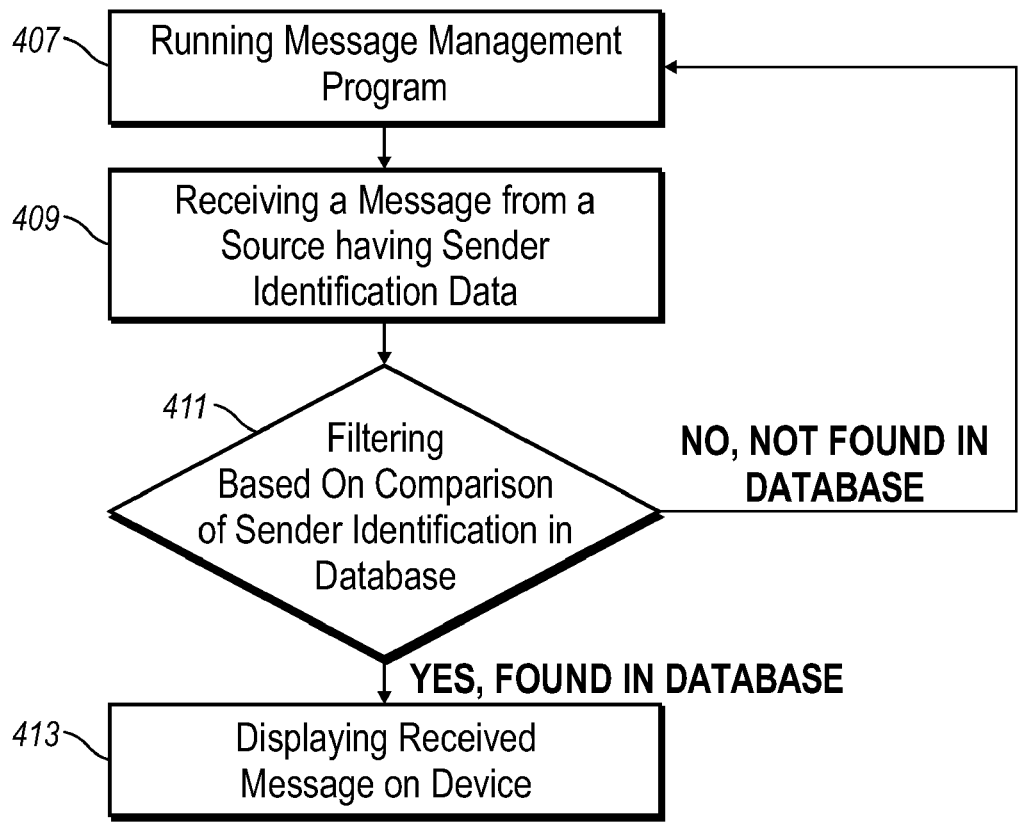
FIG. 4 illustrates an exemplary flow chart of a message filtering method conducted according to the present disclosure.

FIG. 4 illustrates an exemplary flow chart of a method according to the present disclosure, for filtering a received message on a communication device 300. The exemplary method comprises running (block 407) a message management program that manages display of messages on the communication device 300 where the message management program (359) filters incoming messages prior to display of the messages on the display screen 300. The method further comprises receiving a message having sender identification data associated therewith (block 409). Next the method comprises filtering the received message based on a comparison of the sender identification data associated with the received message to approved sender identification data. In some embodiments this approved sender identification data has been retrieved over the internet from a remote database (block 411). Optionally, the method includes displaying the message when the sender identification data is present in the remote database (block 413). In one embodiment, filtered messages may be placed in a folder where an operator may review the filtered messages. Filtered messages may also be displayed to an operator for review of the filtered messages by other methods known to those of skill in the art. In another embodiment, the filtered messages are discarded and the operator will not be able to review the filtered messages.

Additionally, the method may further store the approved sender identification data received over the internet from a remote database. In one example, the method stores the approved sender identification data locally on a memory contained within the communication device 300. In at least one embodiment the remote database comprises a networking data store comprising approved sender identification data. In yet another embodiment the remote database comprises an instant-messaging contact list data store comprising approved sender identification data. In still another embodiment the remote database comprises an instant photo-sharing group data store comprising approved sender identification data. These and other data stores are described below. In at least one embodiment, the method receives the approved sender identification data from the remote databases at a predetermined time. While in another embodiment, the method requests approved sender identification data from the remote databases at a predetermined time. In yet another embodiment, the method determines if the sender is within the locally stored database, and if it is not within the locally stored database, the method requests additional approved sender identification data from the remote database.

Figure 5:
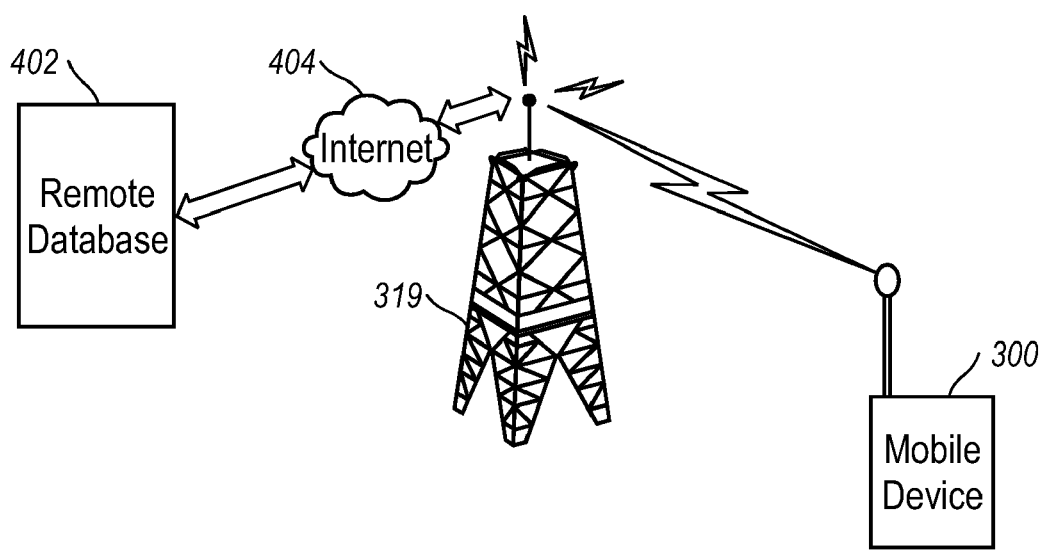
FIG. 5 illustrates the disclosed interaction with a remote database across the internet.

FIG. 5 illustrates a communication device 300 in communication with remote database 402. In this exemplary embodiment, the communication device 300 is in wireless communication with the wireless network 319. The wireless network 319 then communicates with the remote database 402 though an internet connection 404. In one embodiment, the remote database comprises a networking data store such as a social networking data store or a professional networking data store in which approved sender identification data is stored. The networking data store may also comprise contact lists from other data stores which may have religious, political, educational, or other affiliations. Examples of social networking data stores include a contact list from Facebook, MYSPACE, Orkut, FRIENDSTER, and the like. The contact lists are sometimes also referred to as friends lists. Examples of professional networking data stores include contact lists from LINKEDIN, Spoke, Ryze, and the like. In another embodiment, the remote database comprises an instant-messaging contact list data store which constitutes approved sender identification data. Examples of instant-messaging contact list data stores include friend or buddy or other contact lists from AMERICA ONLINE (AOL) INSTANT MESSENGER (AIM), MSN (MICROSOFT) Messenger, YAHOO! Messenger, GOOGLE Talk, BLACKBERRY Messenger and similar instant messaging services. The friend or buddy or other contact lists may comprise a list of one or more user names. In yet another embodiment, the remote database comprises a photo-sharing group data store comprising a photo-sharing group contact lists including friends, groups, and family which constitute approved sender identification data. Examples of photo-sharing group data stores include a friends or family or other contact list from FLICKR, PICASA, SHUTTERFLY, KODAK Gallery and similar photo-sharing data stores. In the above described data stores, the contact lists can be provided based upon individual contacts, group contacts, or a combination thereof. For example, it is possible that a contact is identified because of the inclusion of the contact within a group that the operator of the communication device 300 is associated. In other embodiments, the group is identified through a distribution list and this enables sending messages through the group distribution list and thus the group is identified as a single contact with associated contact information.

In order to access the list of friends or other contacts contained within a given remote database, the message filter application program may require that login information associated with the given website be provided from the communication device 300. This login information may be stored on the communication device 300 or a prompt may be provided to enable the operator to input the required information to the remote database. Once access is granted to the remote database, the list of contacts may be obtained from the remote database. In at least one embodiment, the operator is provided with an option to save login information for each remote database that is to be accessed. The message management program further searches the profiles of those individuals listed as contacts of the operator of the communication device 300 to obtain the details of that particular contact such as email address, telephone number, PIN, and other details that are desired for filtering of received messages. In other databases, the contact information associated with each contact may be stored within the contact listing. The approved sender information obtained from the above described remote databases may be stored locally on the communication device 300 within an address book or another assigned storage location.

When the message filtering program wishes to access contact information of those contacts the connection is performed over the internet. The internet communication 404 illustrated in FIG. 5 may be over any appropriate internet protocol including but not limited to hypertext transfer protocol (http) communication. It will be appreciated by those persons skilled in the art that various internet protocols can be used including the OSCAR (Open System for CommunicAtion in Real-time) protocol and TOC (Talk to Oscar) protocol used in instant messaging. Using these and similar standards, the message filtering program is enabled to search within the list of contacts associated with the operator of the communication device 300 at a given internet based remote database such as the ones described above.

Figure 6:
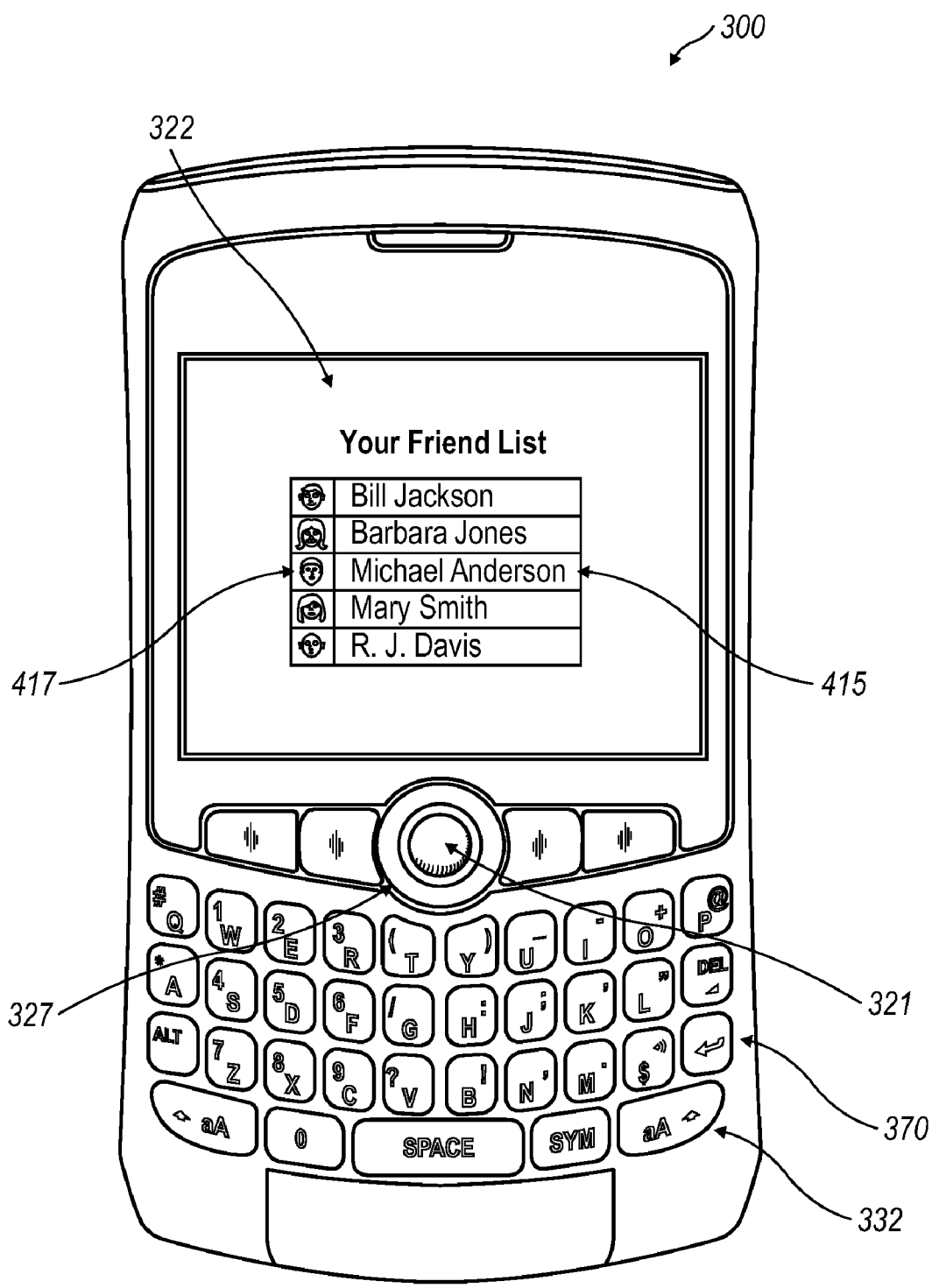
FIG. 6 illustrates a described friend list retrieved to the handheld communication device from a remote database.

FIG. 6 illustrates an exemplary embodiment of an operator view of a contact list stored on, and retrieved from a remote database. In this embodiment the contact list includes name data 415 as well as profile picture 417 information for each contact stored on the remote database. While it is contemplated that each received message may be checked against approved sender identification data over the internet, it is also contemplated that approved sender identification data stored on the remote database can be retrieved (or stored locally) to the communication device where the individual comparisons take place. Retrieved (or locally stored) approved sender identification data can be stored within an address book on the communication device 300. This address book may be a part of another program or operating system executed on the communication device 300. In one embodiment, the message filter program may access the address book within which approved sender identification data is stored to filter incoming messages. Furthermore, the address book can be used as central repository for information obtained from multiple remote databases. For example, the address book may be updated with information from one or more of the following remote databases: a networking data store, an instant-messaging friend list data store, a photo-sharing group data store.

In some embodiments the action of retrieving or caching locally the approved sender identification data stored on the remote database to the communication device 300 is known by those skilled in the art as synchronization. The retrieving or caching locally of the approved sender identification data stored on the remote database may be initiated upon an operator turning on the filter for that particular remote database. In other embodiments, retrieving or caching locally of the approved sender identification data stored on the remote database may be initiated at operator specified times. Operator specified times within this embodiment could mean for example, daily, hourly, weekly, or monthly intervals. Operator specified times could also include more detail such as a specific time and day of the week to periodically refresh the locally stored database. Additionally, the operator may be able to specify whether it is desired to synchronize all contacts, new contacts, or those with updated contact information.

Furthermore, the retrieving or caching locally the approved sender identification data stored on the remote database to the communication device 300 may be initiated by specific events within a given program. Using Facebook as an example, updated approved sender identification data stored on the remote database can be retrieved or stored locally when each time an operator signs into their account. Additionally, approved sender identification data stored on the remote database can be retrieved or stored locally when a new contact is added to an operator's contact list. In another embodiment, the approved sender identification data stored on the remote database can be retrieved or stored locally upon a direct request by the operator to do so.

In other embodiments, the approved sender identification data stored on the remote database is not cached or stored locally. Instead, in this embodiment the approved sender identification is directly accessed from the remote database each time a new message is received by the communication device 300. Directly accessing approved sender identification from the remote database could be advantageous in an environment where reducing the use of storage space is desired.

In at least one embodiment, the request for the contact information can be dependent upon the connection available for the communication device 300. For example if a WI-FI® connection is available the message filtering application may download contact information each time a message is received or when the sender's information is not in the data contained locally on the communication device 300. Alternatively, if only a GPRS connection (or one of similar speed) is available the communication device 300 may be programmed to only download upon operator request. Other examples and schedules could be applied in order to conserve airtime and other charges associated with the operator's communication device 300.

Figure 7:
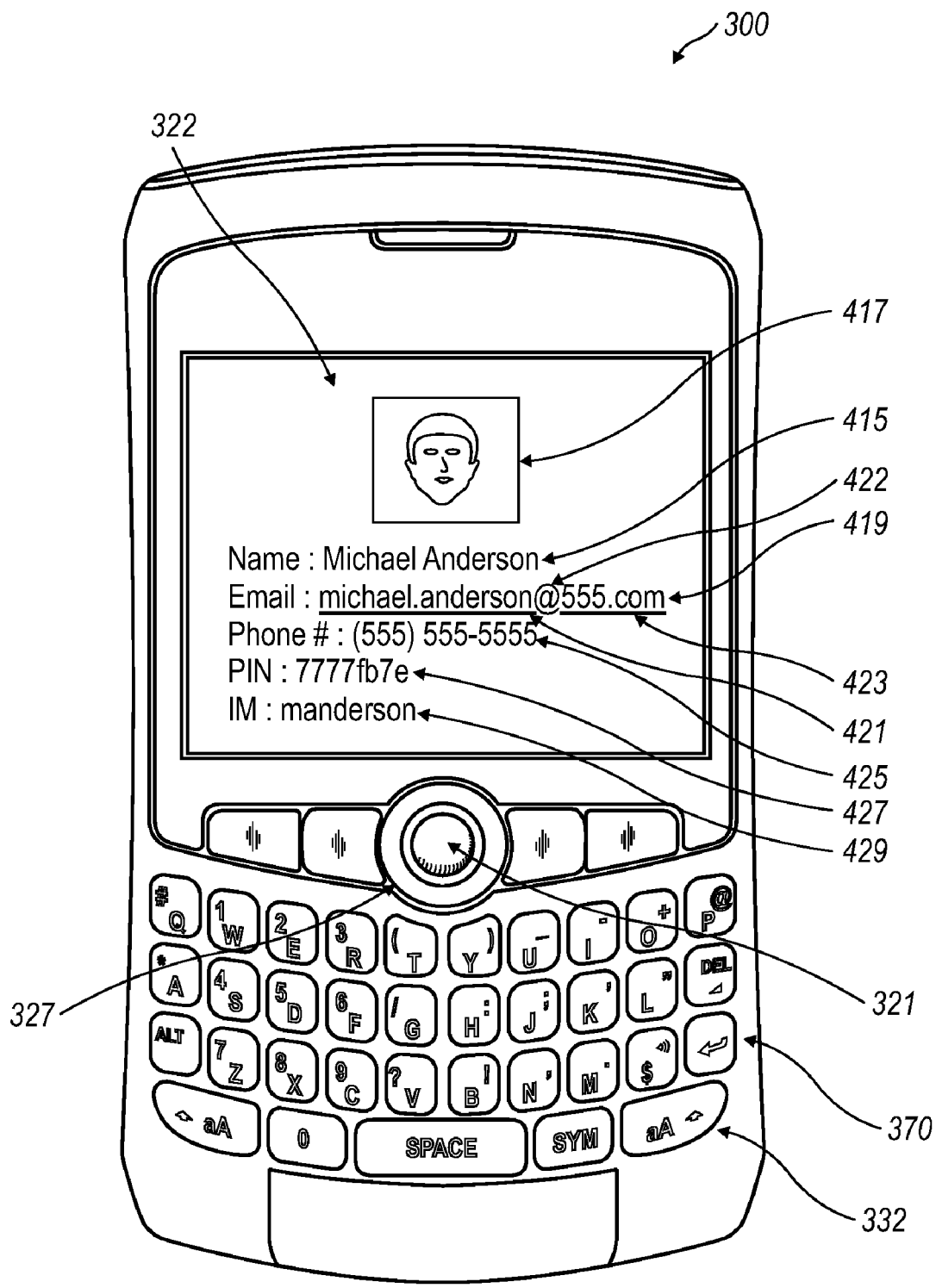
FIG. 7 illustrates approved sender identification data for a particular friend retrieved from a remote database.

FIG. 7 illustrates an embodiment of an operator view of a particular contact sender identification data as stored on a remote server. In this embodiment the sender identification data includes name 415, email address 419, phone number 425, PIN 427, and IM user name 429. Email address 419 includes sender's name 421 before the "at" symbol 422 of the email address 419. Email address 419 includes host name 423 after the "at" symbol 422 of the email address 419. Each piece of sender identification data could be used to filter the messages.

Figure 8:
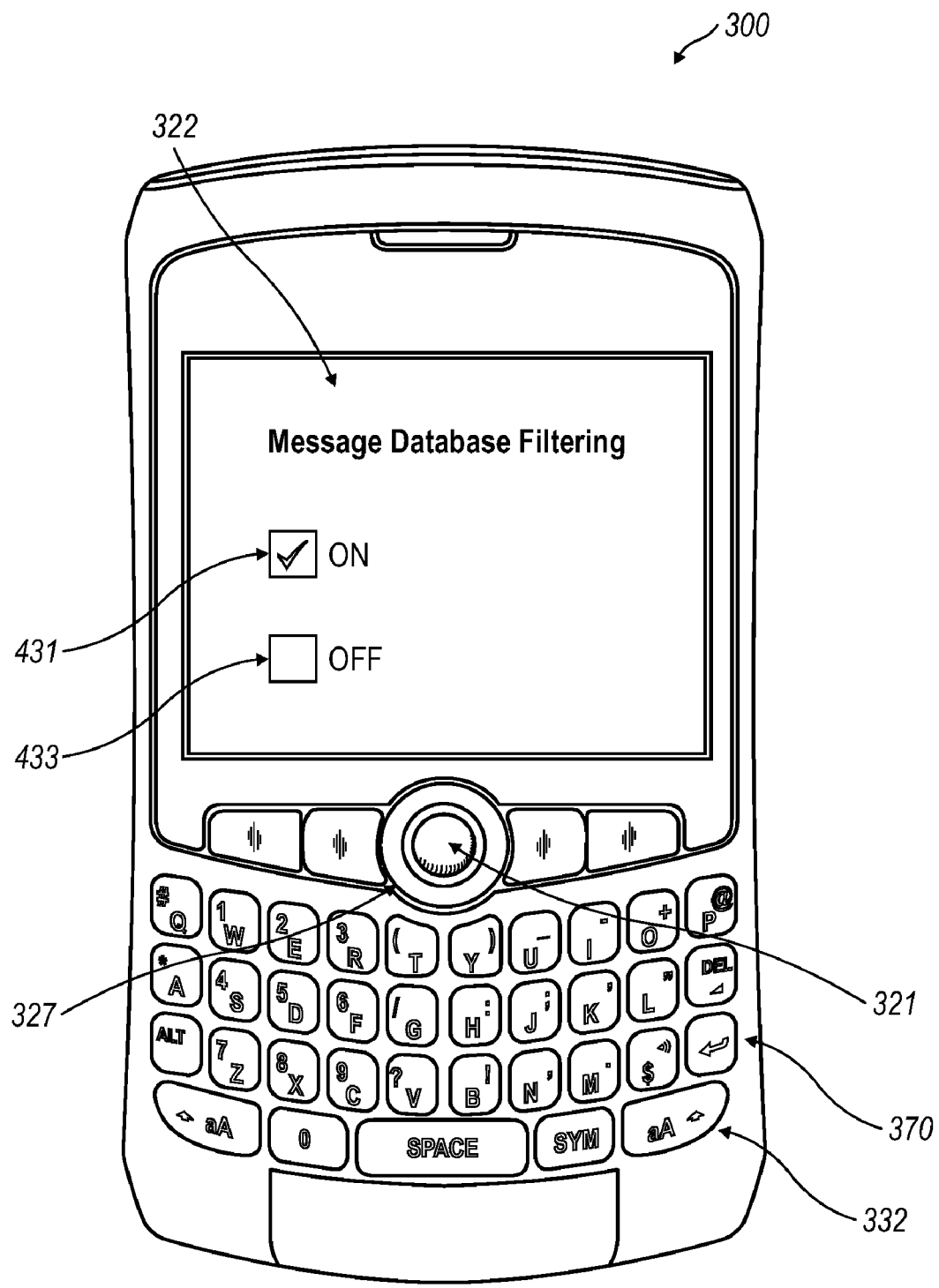
FIG. 8 illustrates a selectively actuable database filter activation control.

While it may be desired to allow for filtering of received messages on the communication device 300, it also may be desired to remove the filtering. As illustrated in FIG. 8, a selectively actuable database filter activation control command can be enabled by the operator. In this illustration a visual indication is presented to an operator to allow message database filtering to be turned on 431 or off 433 on the display screen 322. This visual indication may be presented to an operator during a setup process that initiates when an operator turns on a device for a first time. In another embodiment, an operator may selectively enter this menu during operation of the device to verify or change the current database filter activation control settings. Furthermore, each time the communication device 300 is restarted, the operator can be prompted with this message. In yet another embodiment, the operator is prompted based upon predetermined intervals, which may be operator defined, whether received messages should be filtered or not.

Figure 9:
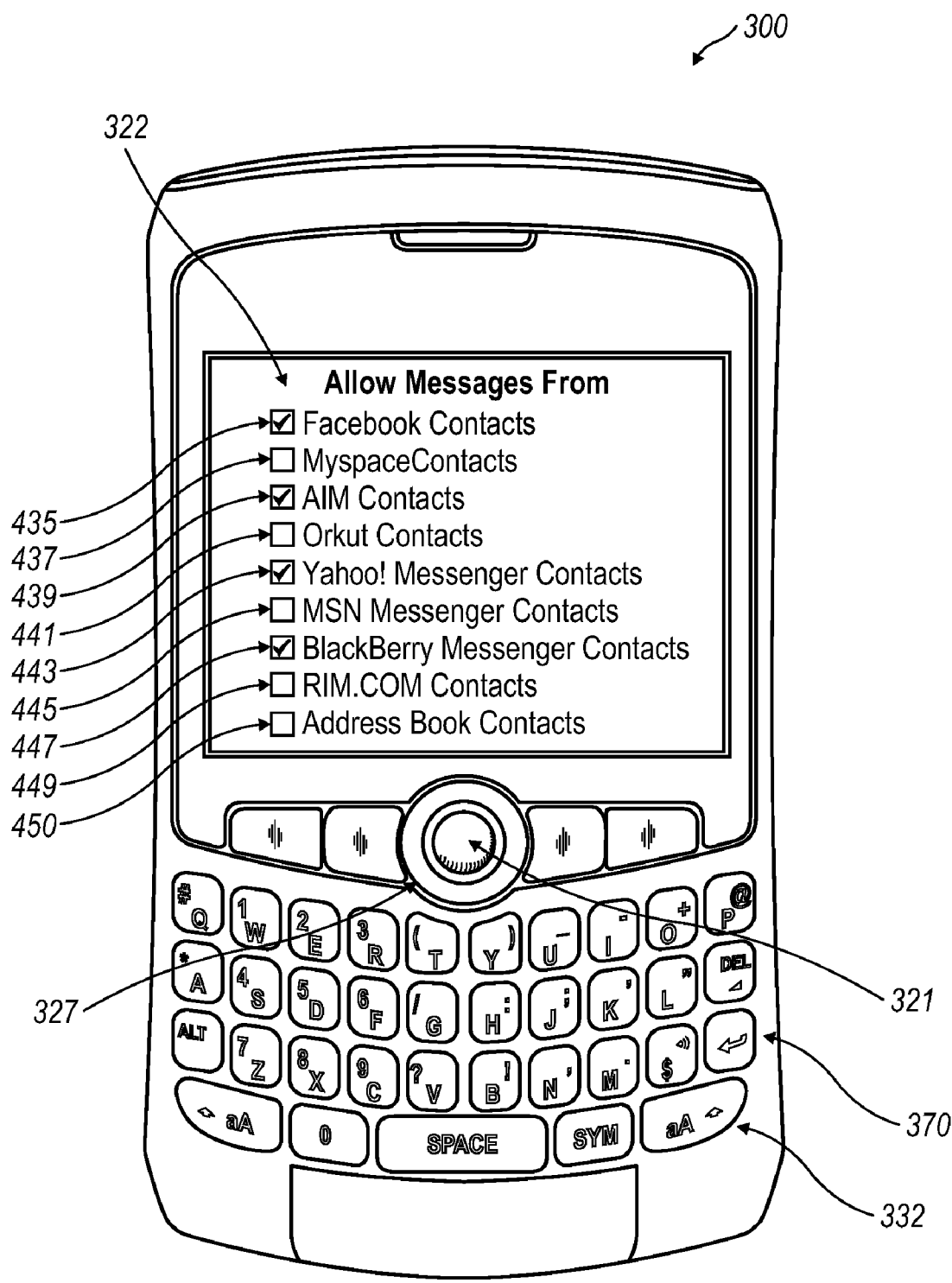
FIG. 9 illustrates a roster of available remote databases that can be accessed for retrieving approved sender identification data.

When filtering of messages is enabled by the operator of the device, the operator may be prompted to select which remote databases should be used in order to obtain sender identification data to filter the messages. FIG. 9 illustrates an embodiment including selectively actuable database filter controls. In this embodiment, an operator can select a single database, no database, or multiple databases to be used to allow messages from contacts associated with the respective databases. According to the example of FIG. 9, an operator may choose to activate or deactivate filtering based on sender identification data within Facebook Contacts 435, MYSPACE Contacts 437, AIM Contacts 439, Orkut Contacts 441, YAHOO! Messenger Contacts 443, MSN Messenger Contacts, BLACKBERRY Messenger Contacts 447, RIM.COM Contacts 449, and Address Book Contacts 450. If filtering of messages is selected as shown in FIG. 8, the operator could be provided with the prompts shown in FIG. 9 such that the operator is able to select which remote databases should be used to determine if a sender is within an approved list of senders. Additionally, the selectively actuable database filter controls visual indication may be presented to an operator upon installation of a program on the communication device 300, such as an instant messenger program. Furthermore, a set list of databases may be pre-installed on the device for the user to select filtering comparison of messages. While in other embodiments, an operator may be provided with a prompt to add, delete, or modify the databases listed in the selectively actuable database filter controls menu based upon trigger events. Additionally, the user may be provided with an interface which allows for user addition of databases not listed in the predefined list where provided. This would enable the operator to filter based upon sites associated with a particular profession, religious association, or the like.

In at least one embodiment, a communication device 300 is configured to receive one of the above described messages. The device includes but is not limited to a display screen 322 upon which messages are displayed. The communication device 300 further includes a microprocessor 338 configured to execute at least one message management program 359, wherein said at least one message management program 359 filters incoming messages. The message management program comprises a message filter application that filters received messages based on a comparison of sender identification data associated with a received message to approved sender identification data. The filtering of the messages can be based upon one of the above described criteria.

In at least one embodiment, the approved sender identification data is retrieved over the internet 404 from a remote database 402. The remote database 402 can be one of the above described databases that can be internet based or otherwise located remote from the communication device 300. The received message can be one of those as described above. When the received message comprises a SMS message, the message filter application filters the SMS message based on a comparison to approved sender identification data comprising one or more phone numbers 425 which can be retrieved from the remote database 402. Likewise, when the received message comprises a MMS message, the message filter application filters the MMS message based on a comparison to approved sender identification data comprising one or more phone numbers 425 which can be retrieved from the remote database 402. Additionally, when the received message comprises a voice-mail message, the message filter application filters the voice-mail message based on a comparison to approved sender identification data comprising one or more phone numbers 425 which can be retrieved from the remote database 402. Furthermore, the received message can be an IM message and the message filter application filters the IM message based on a comparison to approved sender identification data comprising one or more user names 429 which can be retrieved from the remote database 402. Likewise, when the received message comprises a PIN message, the message filter application filters the PIN message based on a comparison to approved sender identification data comprising one or more PIN numbers 427 retrieved from the remote database 402. In at least one embodiment, the message filtering application can filter one or more of the above described messages using the criteria described above.

In yet another embodiment, the message comprises an email message and the message management program comprises an email program. The message filter application filters the received emails based on a comparison to approved sender identification data comprising one or more email addresses 419 which can be retrieved from the remote database 402. The comparison can be as described above. In one example, the message application filters received messages based on a comparison to one or more domain names 423 which can be retrieved from the remote database 402. In another example, the message application filters received messages based on a comparison to one or more sender's names 421 which can be retrieved from the remote database 402.

The communication device 300 can be a smart phone, which can be a device capable of both voice and data transmission. In another embodiment the communication device 300 comprises a personal digital assistant. In yet another embodiment, the communication device 300 comprises a computer. In another embodiment, the communication device 300 can be a handheld wireless communication device.

Additionally the approved sender identification data can be retrieved over the internet 404 from at least two remote databases and the message filter application filters received messages based on a comparison of sender identification data to the approved sender identification data received from the at least two remote databases. The remote databases can be any two of the above described databases, for example, a networking data store and an instant messaging data store. The information from the remote databases can be stored locally or remote from the communication device 300.

In another embodiment a handheld wireless communication device is configured to receive messages. The handheld wireless communication device includes a body 371 housing a display screen 322 upon which messages are displayed. Also a microprocessor 338 is configured to execute at least one message management program 359 on the handheld wireless communication device, where the at least one message management program 359 filters incoming messages. The message management program comprises a message filter application that filters received messages based on a comparison of sender identification data associated with a received message to approved sender identification data retrieved over the internet 404 from at least two remote databases 402. At least one of the remote databases 402 can be a networking data store comprising data representing an approved contact list of the networking data store. If the sender identification data of the received message does not match the approved sender identification data, a prompt is displayed that upon actuation adds the sender identification data of the received message to the approved sender identification data.

In yet another embodiment, a computer-readable medium is configured to have a computer program for controlling a computing device to filter a received message for a communication device 300. The computer program causes a computer to run a message management program 359, wherein the message management program 359 manages display of the messages on the communication device 300. The computer program further can cause the computer to receive a message having sender identification associated therewith. Additionally, the computer program can cause the computer to filter the received message based on a comparison of the associated sender identification data to approved sender identification data retrieved over the internet 404 from a remote database 402. The computer program can optionally be programmed to filter messages as described above. Furthermore, the computer-readable medium can be installed on various devices including but not limited to a communication device, a handheld wireless communication device, a personal digital assistant, a desktop computer, a laptop computer, a server, or the like.

While the above has been described in relation to processing of the messages once they are received by the communication device 300, the filtering of the messages may be done upstream in the communication network from the communication device 300. For example, an email server may be programmed to filter messages using the method and arrangement as outlined above. Furthermore, other components such as relays, switches, and other network components could be designed so that they effectively filter out those messages that are not desired by the user. These upstream settings could be modified by the operator of the communication device 300 or an administrator associated with the communication network. When one of the upstream servers, relays, switches, or other network components is programmed according to the above description, a message that is not from an approved sender will not be delivered to the communication device 300.

Exemplary embodiments have been described hereinabove regarding the implementation of message filtering on network operable communication devices 300. As described, the filtering of particular received messages is based on a comparison of sender identification data associated with the received message to sender identification data stored, and optionally retrieved from a remote database. Various modifications to and departures from the disclosed embodiments will occur to those having skill in the art. The subject matter that is intended to be within the spirit of this disclosure is set forth in the following claims.

What is claimed is:

1. A communication device configured to receive messages, said device comprising:
   a display screen upon which messages are displayed;
   a microprocessor configured to execute at least one message management program, wherein said at least one message management program filters incoming messages;
   a selective filter control operative on the communication device, said selective filter control configured to display a listing of a plurality of remote databases and to receive a selection, from an operator of the device, of one or more selected remote databases from the plurality of remote databases, the one or more selected remote databases to be used by the message management program to obtain approved sender identification data and to determine if a sender is within a list of contacts associated with at least one of the one or more selected remote databases;
   and
   said message management program comprising a message filter application that filters said incoming messages based on a comparison of sender identification data associated with the sender of an incoming message to the obtained approved sender identification data.

2. The communication device as recited in claim 1, wherein said approved sender identification data is retrieved over the internet from the one more remote databases.

3. The communication device as recited in claim 1, wherein said incoming message comprises a SMS message; and
   wherein said approved sender identification data comprises one or more phone numbers.

4. The communication device as recited in claim 1, wherein said incoming message comprises a MMS message; and
   wherein said approved sender identification data comprises one or more phone numbers.

5. The communication device as recited in claim 1, wherein said incoming message comprises an IM message; and
   wherein said approved sender identification data comprises one or more IM user names.

6. The communication device as recited in claim 1, wherein said approved sender identification data retrieved through the internet is stored locally on the communication device.

7. The communication device as recited in claim 1, wherein said incoming message comprises a voice-mail message; and
   wherein said approved sender identification data comprises one or more phone numbers.

8. The communication device as recited in claim 1, wherein said incoming message comprises a PIN message; and
   wherein said approved sender identification data comprises one or more PIN numbers.

9. The communication device as recited in claim 1, wherein said incoming message comprises an email; and
   wherein said message management program comprises an email program.

10. The communication device as recited in claim 1, wherein said incoming message comprises an email; and
    wherein said message filter application filters incoming emails based on a comparison to approved sender identification data comprising one or more email addresses.

11. The communication device as recited in claim 9, wherein said message filter application filters incoming messages based on a comparison to one or more domain names.

12. The communication device as recited in claim 9, wherein said message filter application filters incoming messages based on a comparison to one or more sender's names of email addresses.

13. The communication device as recited in claim 1, wherein said communication device comprises a smart phone.

14. The communication device as recited in claim 1, wherein said communication device comprises a personal digital assistant.

15. The communication device as recited in claim 1, wherein said communication device comprises a computer.

16. The communication device as recited in claim 1,
    wherein said approved sender identification data is retrieved over the internet from at least two different remote databases; and
    wherein said message filter application filters incoming messages based on a comparison of sender identification data to the approved sender identification data received from the at least two different remote databases.

17. A method for filtering a received message for a communication device, the method comprising:
    displaying a listing of a plurality of remote databases for operator selection on the display screen;
    receiving a selection, from an operator of the device, at a selective filter control of the communication device, of one or more remote databases from the plurality of remote databases, the one or more selected remote databases to be used to obtain approved sender identification data and to determine if a sender is within a list of contacts associated with at least one of the one or more selected remote databases;
    obtaining approved sender identification data from the one or more remote databases selected;

running a message management program that manages display of messages on a communication device;

receiving a message having sender identification data associated therewith; and filtering the message based on a comparison of the associated sender identification data of the received message to the obtained approved sender identification data.

18. The method of claim 17, further comprising displaying the message if the sender identification data associated with the message matches approved sender identification data retrieved from the selection of the one or more remote databases.

19. The method of claim 17, further comprising caching said approved sender identification data retrieved over the internet from the selection of the one or more remote databases locally on the communication device.

20. The method of claim 17, wherein the one or more remote databases comprises a networking data store comprising approved sender identification data.

21. The method of claim 17, wherein the one or more remote databases comprises an instant-messaging contact list data store comprising approved sender identification data.

22. The method of claim 17, wherein the one or more remote databases comprises a photo-sharing group data store comprising approved sender identification data.

23. A non-transitory tangible computer-readable medium having a computer program for controlling a computing device to filter a received message for a communication device, the computer program causing a computer to:

display a listing of a plurality remote databases for selection on the display screen:

receive a selection, from an operator of the device, at a selective filter control of the communication device, of the one or more remote databases from the plurality of remote databases, the one or more selected remote databases to be used to obtain approved sender identification data and to determine if a sender is within a list of contacts associated with at least one of the one or more selected remote databases;

obtain approved sender identification data from the one or more remote databases selected;

run a message management program, wherein said message management program manages display of messages on the communication device;

receive a message having sender identification data associated therewith; and filter the received message based on a comparison of the associated sender identification data of the received message to the obtained approved sender identification data.

24. A handheld wireless communication device configured to receive messages, said handheld wireless communication device comprising:

a body housing a display screen upon which messages are displayed;

a microprocessor configured to execute at least one message management program on the handheld wireless communication device, wherein said at least one message management program filters incoming messages;

a selective filter control operative on the communication device, said selective filter control configured to display a listing of a plurality of remote databases and to receive a selection, from an operator of the device, of one or more remote databases from a plurality of remote databases, the one or more selected remote databases to be used by the message management program to obtain approved sender identification data and to determine if a sender is within a list of contacts associated with at least one of the one or more selected remote databases;

and said message management program comprising a message filter application that filters incoming messages based on a comparison of sender identification data associated with the sender of a message to the obtained approved sender identification data, at least one of said remote databases comprising a networking data store comprising data representing an approved contact list of the networking data store and wherein if the sender identification data of the incoming message does not match the approved sender identification data, a prompt is displayed that upon actuation adds the sender identification data of the incoming message to the approved sender identification data.

\* \* \* \* \*